United States Patent [19]

Geiser

[11] Patent Number: 5,059,965
[45] Date of Patent: Oct. 22, 1991

[54] METHOD OF AND DEVICE FOR SELECTION OR ENTRY OF A DESTINATION IN A MOTOR VEHICLE SYSTEM

[75] Inventor: Georg Geiser, Karlsruhe, Fed. Rep. of Germany

[73] Assignee: Robert Bosch GmbH, Stuttgart, Fed. Rep. of Germany

[21] Appl. No.: 415,338

[22] PCT Filed: Mar. 18, 1988

[86] PCT No.: PCT/DE88/00168
  § 371 Date: Sep. 1, 1989
  § 102(e) Date: Sep. 1, 1989

[87] PCT Pub. No.: WO88/08119
  PCT Pub. Date: Oct. 20, 1988

[30] Foreign Application Priority Data
  Apr. 11, 1987 [DE] Fed. Rep. of Germany ....... 3712360

[51] Int. Cl.$^5$ ............................................. G08G 1/123
[52] U.S. Cl. ................................. 340/995; 340/825.19; 341/26; 364/449
[58] Field of Search ........... 340/995, 990, 988, 825.19; 73/178 T; 364/449; 341/21, 26, 27, 29, 34; 434/112, 116, 117

[56] References Cited

U.S. PATENT DOCUMENTS

| | | | |
|---|---|---|---|
| 4,241,521 | 12/1980 | Dufresne | 340/825.19 |
| 4,313,113 | 1/1982 | Thornburg | 341/34 |
| 4,458,238 | 7/1984 | Learn | 340/825.19 |
| 4,688,037 | 8/1987 | Krieg | 341/21 |
| 4,737,927 | 4/1988 | Hanabusa et al. | 340/995 |
| 4,746,913 | 5/1988 | Volta | 340/825.19 |
| 4,758,829 | 7/1988 | Smith, III | 340/825.19 |

FOREIGN PATENT DOCUMENTS

| | | | |
|---|---|---|---|
| 0109921 | 6/1983 | Japan | 341/27 |
| 2153568 | 8/1985 | United Kingdom | 341/21 |

OTHER PUBLICATIONS

*IBM Technical Disclosure Bulletin*, vol. 21, No. 9, Feb. 1979, "Audio Device for the Blind", Head et al., p. 3776.
"APS Text Search & Retrieval Classroom Manual", Planning Research Corp., May 1987.

*Primary Examiner*—Donnie L. Crosland
*Assistant Examiner*—Brent A. Swarthout
*Attorney, Agent, or Firm*—Michael J. Striker

[57] ABSTRACT

A method of and device for selection or entry of a destination in a motor vehicle navigation system. The selection of a destination designation from a stored destination list or the entry of the destination designation is effected by selecting letter positions of the destination designation in a stepwise manner with a first component of a manual input element, and by running the alphabet through, per letter position, at a speed or step size which can be varied as desired until the desired letter is reached with a second component of a manual input element. The acknowledgement of the selected letters or numbers is effected by means of an optical display and, in particular, acoustically by means of vocal output.

9 Claims, 2 Drawing Sheets

METHOD OF AND DEVICE FOR SELECTION OR ENTRY OF A DESTINATION IN A MOTOR VEHICLE SYSTEM

BACKGROUND OF THE INVENTION

The invention relates to a method of a device for selection or entry of a destination location, in a navigation system of a motor vehicle. Present motor vehicle navigation systems, or those being developed, give the driver information for choosing the driving direction at intersections during driving after the driver has input his destination into the navigation system. All locations in the region whose map is digitally stored in the navigation system, are taken into consideration as driving destinations. With respect to traffic safety, the manner in which the driver indicates the driving destination has particular importance.

The driver can convey the driving destination to the navigation system by using a road map, a numeric code, or the name of the destination (location, street and street address). The handling of a road map or a handbook for taking the numeric code of the destination is a rather cumbersome procedure and can not be considered for use in the motor vehicle during driving. The driver can fix the destination location by selecting the destination from the list of all possible destination locations (destination list) stored in the navigation system. The entry of a destination location not yet contained in the destination list is required only in special cases. The method of selecting the destination has the advantage that the driver need enter only the minimum number of letters and numbers of the destination location which allow an unequivocal assignment to a destination on the destination list. Vocal input would be the ideal method for selecting or entering the destination location but this can not yet be considered at present or in the near future due to the present technical limitations. Selection or entry of the destination location by means of a keyboard, whether this is an alphanumeric complete keyboard or one of the numerous keyboard variants with a reduced number of keys, has the disadvantage that it may be carried out only when the vehicle is stationary, since it would be too distracting for the driver during driving. The word-by-word search ("scrolling") is known as a method for selecting the destination from the destination list; in this method, the destination list in which the destinations are stored alphabetically can be scrolled behind an optical display window by two direction switches. Due to the large number of possible destinations, this method also has an effect which is too distracting to be used during driving.

SUMMARY OF THE INVENTION

The object of the invention is developing a method for selection or entry of destination locations in a navigation system whose distracting effect is so slight that it can also be used when driving.

This object is met, according to the invention, in that the selection or entry of the destination is effected by a position-by-position scrolling of the letters of the alphabet, in that the alphabetic or numerical positions of the destination name are selected in a stepwise manner with a first component of a manual input element, and in that the alphabet is run through per letter position with a second component of a manual input element at a speed or step size which can be varied as desired until the desired letter is reached. The efficiency of the search can be increased by taking into consideration the occurrence probabilities of individual letters and letter groups (e.g. two-digit groups, three-digit groups). In addition to the optical display of the respective selected letter, an acoustic acknowledgement is effected by a vocal output, which constitutes a substantial feature of the method. The two components of the manual input element are preferably integrated in a single input member.

The advantages which can be attained with the invention consist particularly in that the driver can execute a destination input or destination selection in an extensively "blind"during driving, i.e. without claiming too much of his visual attention and, accordingly, without being distracted from the traffic situation in a dangerous manner. In addition, the entry of letters by position provides the advantage that the selecting process is substantially shortened in comparison to the searching of destination by words. An additional shortening of the entry time is achieved by making use of the occurrence probabilities of individual letters and letter groups. The letter-by-letter (and number-by-number) acoustic acknowledgement by speech output constitutes an information load which can be tolerated by the driver in contrast to speech output by words and leads to a reduction of the entry time. Moreover, a complete synthesis of vocals is not required for the speech output of letters and numbers; rather, digitally stored statements of a human speaker can be used so that a good to very good speech quality can be achieved.

The present invention both as to its construction so to its method of operation, together with additional objects and advantages thereof, will be best understood from the following detailed description of the preferred embodiments with reference to the accompanying drawings.

FIGS: 1(a), (b) and (c) show a two-dimensional input element 1, 2 for selecting a letter position and for running through the alphabet per the letter position. This input element can consist of two rockers which are perpendicular to one another or can be constructed as a joystick. A corresponding graphic representation on a screen with touch input is also suitable. The actuation of the horizontal component 1 serves for the stepwise selection of the letter position in that a binary signal is produced by pressing on the left-hand or right-hand side, which signal activates the next letter position located next to the initial position on the right of left. The vertical component 2 serves for running through the letter alphabet in a stepwise manner until a letter appears at the selected letter position which agrees with that at the corresponding position of the destination location. The positionby-position selection of a number, e.g. the street address, is carried out in a corresponding manner. In order to shorten the selection process, the vertical component of the input element can be constructed in such a way that the run-through speed is increased continuously or in steps when pressing on the upper or lower end with increasing actuating force and/or increasing actuating path, that is displacement of the input component. Another step is the reduction of the quantity of the passing letters by context, or with increasing deflection, or with increasing pressure on the input element 2. The occurrence probabilities of individual letters and letter groups can be taken into consideration in selecting the subset of letters. For example, it is discerned from the list of postal codes that in German place names only the letters "A", "E", "I", "O", "Ö", "U", "ü", and "Y" can follow the initial letter "H", so that the maximum subset of letters to be run through in the second letter position after "H" can be limited to 8. Another possibility of limiting the number of letters to be run through results from the destination locations contained in the destination list. The number of alternative destination locations in the destination list taken into consideration decreases as the number of letter positions of the destination location selected by the user increases. Therefore, for the next letter position to be selected only those letters which occur in this position in the subset of destination locations limited by the preceding letter positions are to be taken into consideration. For example, for the selection of the letter sequence "KARLSR", which is necessary and sufficient for the selection of the destination name "KARLSRUHE" from the list of postal codes, 29, 12, 18, 12 and 8 letters, in sequence, are to be included in the subset to be run through.

Figure 1A:
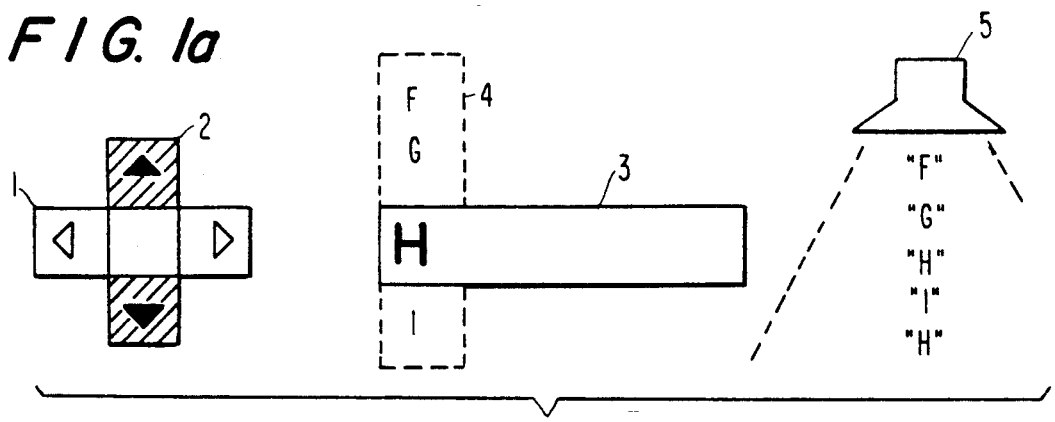
FIG. 1 shows a schematic view showing the cooperation of input element, optical display and speech output.

The optical display 3 serves to show the entered destination name and to acknowledge the selection of the letter or number position and the run-through process of the alphabet or a subset thereof. A portion of the letters running through is shown in FIG. 1 by the area 4 framed by dashes. In addition to the optical acknowledgment of the selection process, the acoustic acknowledgement by means of speech output, which is indicated by the loudspeaker 5, is essential for application in the motor vehicle. The letter shown on the display field at the selected position at a given moment is conveyed in the shortest possible form by speech output, so that the driver can follow the running through of the letters or numbers by sound and need only occasionally divert his view from the traffic in order to observe the display 3. For this purpose, a vocal output is required whose vocabulary comprises the letters and numbers in conventional vocal mode, that is, "a",...,"jay",...,"zee" and "zero",...,"nine". The disadvantage of the risk of confusing the letters is offset by the advantage of short speech duration; moreover, mistakes in hearing the letters or numbers can easily be discovered by means of glancing at the optical display 3. However, it is also possible to pronounce the letters according to an entered spelling alphabet, e.g. "Anton", "Berta", "Cäsar", etc. It is substantial that the method of complete synthesis of human speech can be dispensed with by this type of vocal output; on the contrary, digitally stored statements of a human speaker can be used, and a very natural and understandable speech can be achieved. As soon as there is as an unequivocal assignment of the entered letters to one of the stored destination names, this destination name is shown on the optical display 3. The user confirms by an acknowledgement key (not shown) or by actuating the right-hand side of the horizontal component 1 of the input element again. If the destination location consists of a plurality of parts, such as place, street and street address, the individual parts of the name are entered one after the other in the described manner.

Figure 1B:
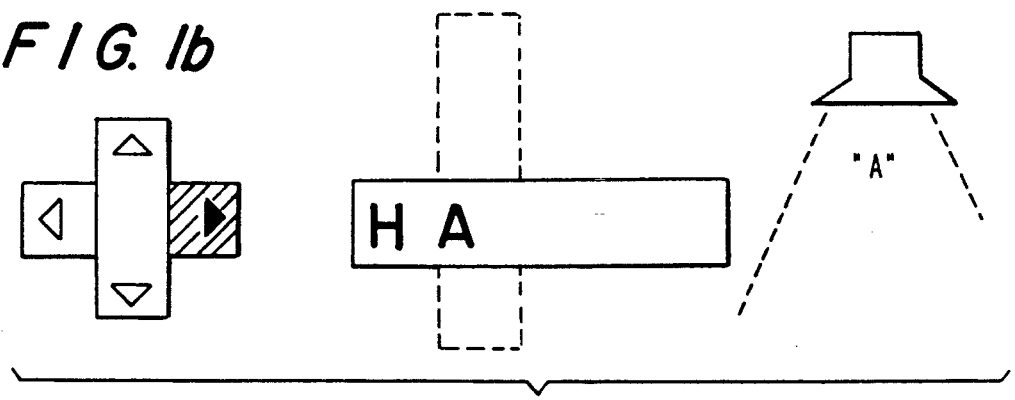
Figure 1C:
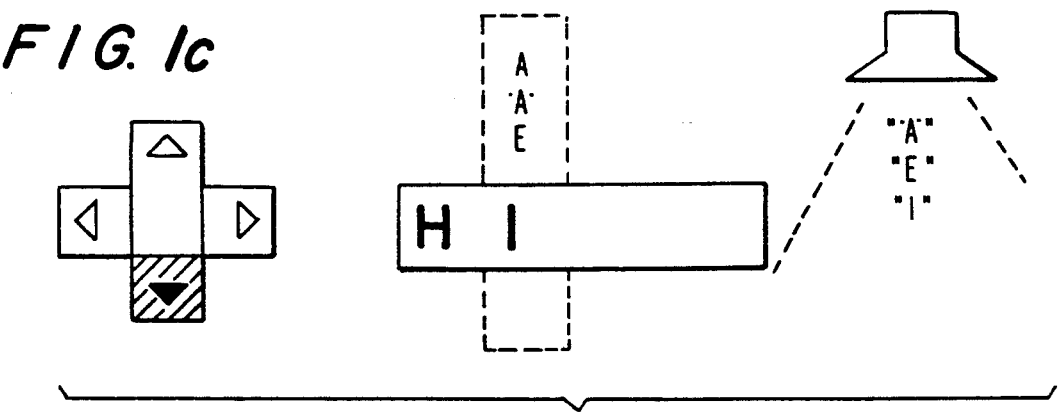

FIGS. 1 a–c show the sequence of the entry of 2 letters "HI". First, the letter "H" is set at the first position with the vertical component of the input element, wherein an "overshooting" by one letter is seen at the vocal output. After the first letter "H" is set, the second letter position is selected in FIG. 1b by pressing on the right-hand side of the horizontal component of the input element. As mentioned above, only a subset of 8 letters comes under consideration after the initial letter "H", a selection being made from this subset according to FIG. 1c.

Figure 2:
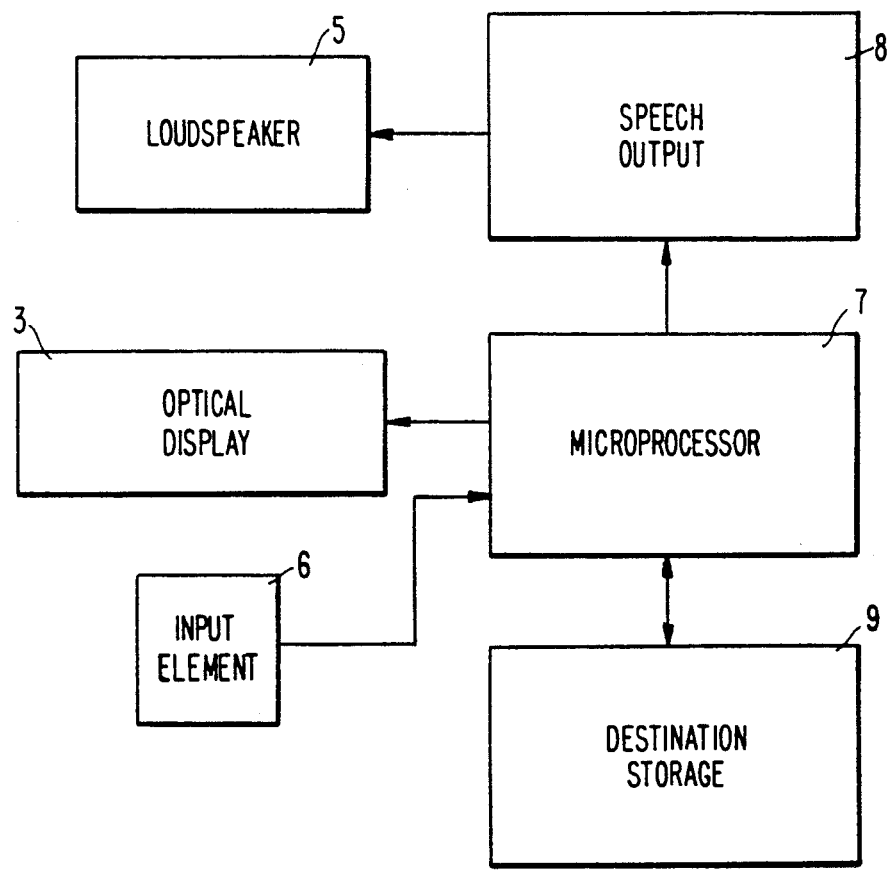
FIG. 2 shows a block wiring diagram of the entire device.

FIG. 2 shows a block wiring diagram of the device for destination entry or selection. The letter selection by position is carried out by an input element 6, which comprises the horizontal and vertical components 1 and 2. A digital computer 7, e.g. a microprocessor, processes the control signals of the input element 6 and controls the optical display 3 as well as the vocal output 8 with the loudspeaker 5. The computer 7 compares the entered letters with the destination locations stored in the destination storage 9 and gives the complete destination location when there is an unequivocal assignment.

Another advantageous construction of the invention can consist in that the user can substitute a "?" for portions of the destination name when he has incomplete knowledge of the spelling of a destination name or in order to abbreviate the entry. For example, the destination "GROSS GERAU" can be entered in an abbreviated manner by "?GERAU". In order to make use of this possibility it is helpful if the "?" is in the front position when running through the alphabet. When the "?" is placed before the "A", activation is effected by means of actuating the upper side of the vertical component of the input element.

I claim:

1. A method of selection or entry of a destination in a motor vehicle navigation system including manual input means having horizontal and vertical components, an optical display, a speech output, and computer means, said method comprising the steps of selecting a letter position with the horizontal component; running through a letter alphabet with the vertical component until a letter corresponding to a letter determining a destination name appears at the selected letter position; indicating the selecting and running steps on the optical display; effecting acoustic acknowledgement of the letter to be entered; and effecting one of selection of the destination and entry of the destination by computer means by effecting the horizontal and vertical components; and determining a subset of letters that can follow a predetermined letter and running only through said subset of letters in a letter position immediately following a position of the predetermined letter.

2. A method according to claim 1, wherein the horizontal and vertical components of the input means are formed as two rockers arranged perpendicular to each other and having opposite actuatable right and left ends and upward and downward ends, respectively, said selecting step including a stepwise selection of the letter position by actuating one of the right and left ends of the horizontal component, and said running-through step including stepwise running-through of the letter alphabet by actuating one of the upward and downward ends of the vertical component.

3. A method according to claim 1, wherein the horizontal and vertical components of the input means are formed as a joystick actuatable to right and left and upward and downward sides, respectively, said selecting step including a stepwise selection of the letter position by actuating the joystick to one of the right and left sides, and said running-through step including continuous running-through of the letter alphabet by actuating the joystick to one of the upward and downward sides.

4. A method according to claim 1, wherein said acoustic acknowledgement step includes outputting a selected letter in a form of a vocal announcement of the letter.

5. A method according to claim 1, wherein said acoustic acknowledgement step includes outputting a selected letter in a form of a vocal announcement by using a conventional spelling alphabet.

6. A method according to claim 1, wherein said running-through step includes varying one of a run-through speed and step lenght of the letter alphabet to thereby shorten entry process.

7. A method according to claim 1, wherein said runningthrough step includes varying one of a run-through speed and a step length by changing at least one of actuating force and a displacement path of the input means to thereby shorten an entry process.

8. A method according to claim 1, further comprising the step of providing a question mark sign instead of at least one letter and using the question mark for one of a portion of a destination name when the spelling of the portion is not completely known, and for a destination name portion when a remaining portion of the destination name defines a corresponding destination.

9. A method according to claim 8, wherein said question mark providing step includes providing the question mark sign at a beginning of a row of alphabet letters.

* * * * *